(12) United States Patent
Hanson, Jr. et al.

(10) Patent No.: US 7,267,388 B2
(45) Date of Patent: Sep. 11, 2007

(54) WINDSHIELD ATTACHMENT

(75) Inventors: Donald S. Hanson, Jr., Evans, GA (US); Richard Krall, Augusta, GA (US)

(73) Assignee: Textron Inc., Providence, RI (US)

( * ) Notice: Subject to any disclaimer, the term of this patent is extended or adjusted under 35 U.S.C. 154(b) by 0 days.

(21) Appl. No.: 11/374,641

(22) Filed: Mar. 13, 2006

(65) Prior Publication Data

US 2006/0249976 A1 Nov. 9, 2006

Related U.S. Application Data

(63) Continuation-in-part of application No. 11/120,869, filed on May 3, 2005.

(51) Int. Cl.
*B60J 1/00* (2006.01)
(52) U.S. Cl. ............... 296/77.1; 296/84.1; 296/96.21; 52/204.597
(58) Field of Classification Search ............... 296/77.1, 296/84.1, 96.21, 79, 146.15, 201; 52/208, 52/204.597
See application file for complete search history.

(56) References Cited

U.S. PATENT DOCUMENTS

| | | | |
|---|---|---|---|
| 1,447,851 A | | 3/1923 | Howard |
| 3,245,182 A | * | 4/1966 | Zierold ..................... 52/208 |
| 4,001,994 A | * | 1/1977 | Williams et al. ........ 52/204.597 |
| 4,343,503 A | * | 8/1982 | Samuelson et al. ...... 296/96.21 |
| 4,488,750 A | * | 12/1984 | Gerber ..................... 296/77.1 |
| 4,555,884 A | * | 12/1985 | van Eerden ............ 52/204.597 |
| RE32,509 E | * | 9/1987 | Werner .................. 52/204.597 |
| 4,773,695 A | | 9/1988 | Jones et al. |
| 4,795,205 A | | 1/1989 | Gerber |
| 4,819,979 A | | 4/1989 | Moglia |
| 5,192,109 A | * | 3/1993 | Roberts ..................... 296/84.1 |
| 5,195,797 A | * | 3/1993 | Hobbs ........................ 296/77.1 |
| 5,310,235 A | | 5/1994 | Seymour |
| 5,385,379 A | * | 1/1995 | Heavner .................... 296/84.1 |
| 5,385,380 A | * | 1/1995 | Heavner .................... 296/84.1 |
| 5,463,189 A | * | 10/1995 | Deneke et al. .......... 174/138 G |
| 5,568,953 A | | 10/1996 | Showalter |
| 5,791,720 A | * | 8/1998 | Moore et al. ............ 296/96.21 |
| 5,954,385 A | * | 9/1999 | Moore et al. ............ 296/96.21 |
| 5,975,615 A | * | 11/1999 | Showalter ............... 296/96.21 |
| 6,007,134 A | | 12/1999 | Weston |

(Continued)

FOREIGN PATENT DOCUMENTS

FR 613 184 11/1926

(Continued)

*Primary Examiner*—Kiran B. Patel
(74) *Attorney, Agent, or Firm*—Harness, Dickey & Pierce, P.L.C.

(57) ABSTRACT

A window assembly cooperating with a window frame on a golf car includes a first window pane selectively coupled to the window frame. A second window pane is selectively coupled to the window frame and offset from the first window pane. A first pair of retaining members are arranged on the window frame in an installed position and movable between a retaining position wherein the retaining members retain the first window pane in an upright position and a release position wherein the retaining members are disengaged from the first window pane. Each of the first pair of retaining members are defined by a rigid frame having an integrally molded elastomeric body.

2 Claims, 17 Drawing Sheets

U.S. PATENT DOCUMENTS

| | | |
|---|---|---|
| 6,276,745 B1 | 8/2001 | Wilson |
| 6,302,440 B1 | 10/2001 | Goodstein |
| 6,481,780 B2 | 11/2002 | Dolan et al. |
| 6,497,444 B1 | 12/2002 | Simon |
| 6,663,158 B1 * | 12/2003 | Showalter ................ 296/96.21 |
| 6,761,391 B2 | 7/2004 | Winkler |
| 6,776,445 B1 | 8/2004 | Conner et al. |
| 2002/0084669 A1 | 7/2002 | Goodstein |
| 2005/0039316 A1 | 2/2005 | Dolan |
| 2006/0218875 A1 * | 10/2006 | Hornung et al. ....... 52/204.593 |

FOREIGN PATENT DOCUMENTS

| | | |
|---|---|---|
| WO | WO97/16324 | 5/1997 |

* cited by examiner

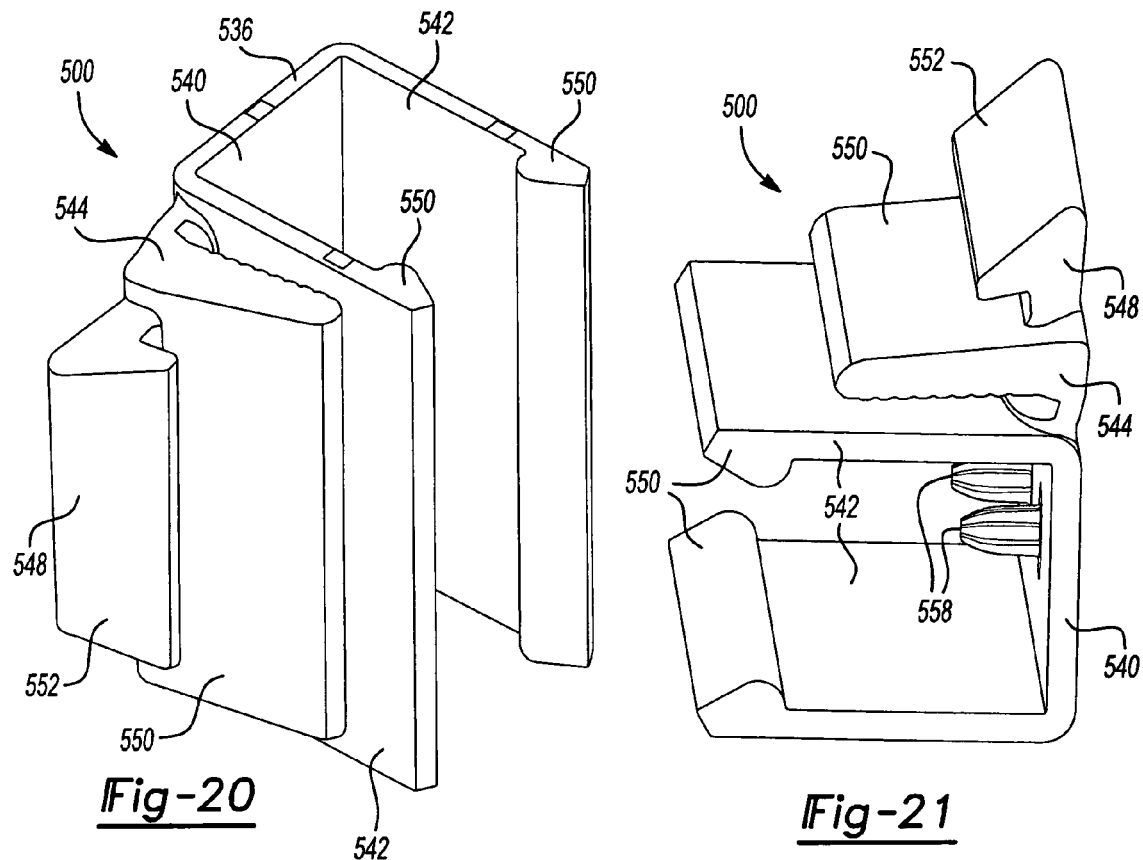
Fig-20
Fig-21
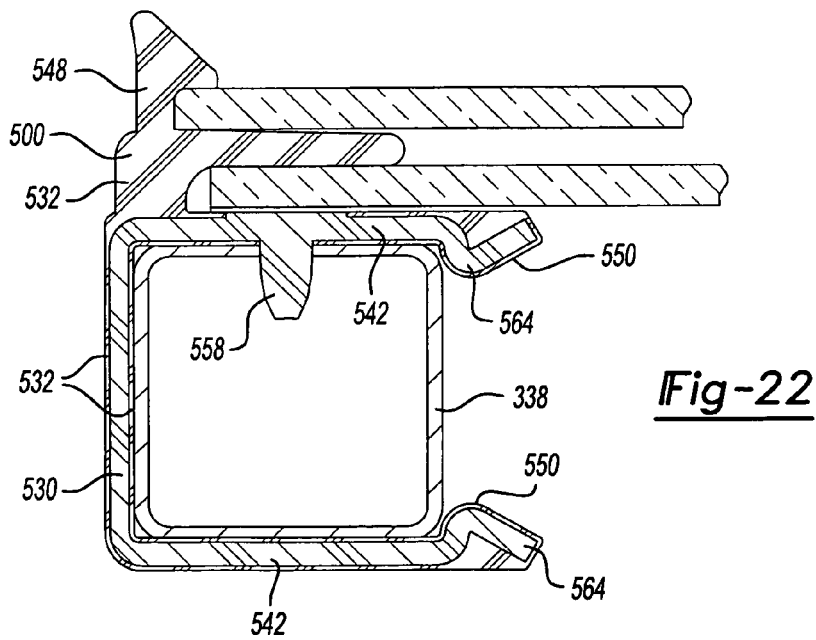
Fig-22

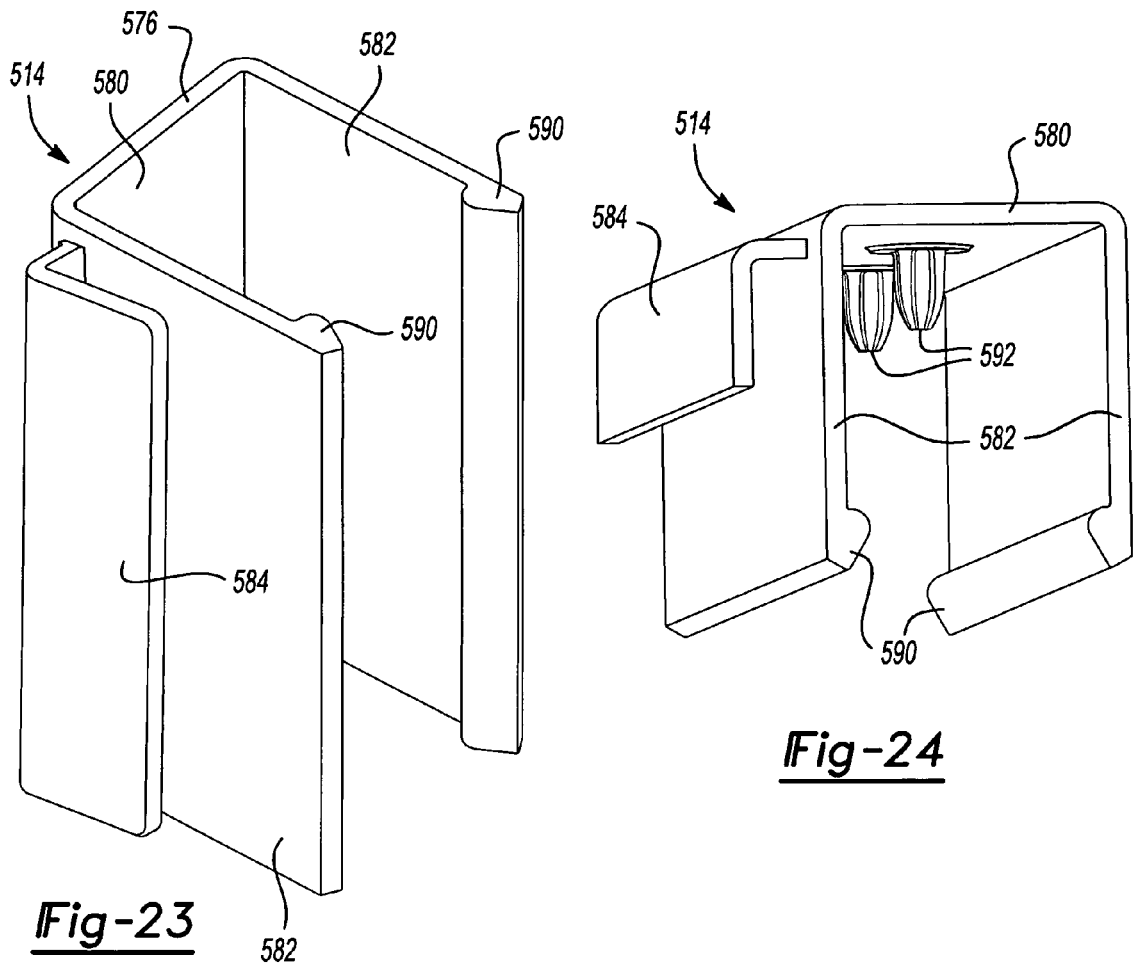
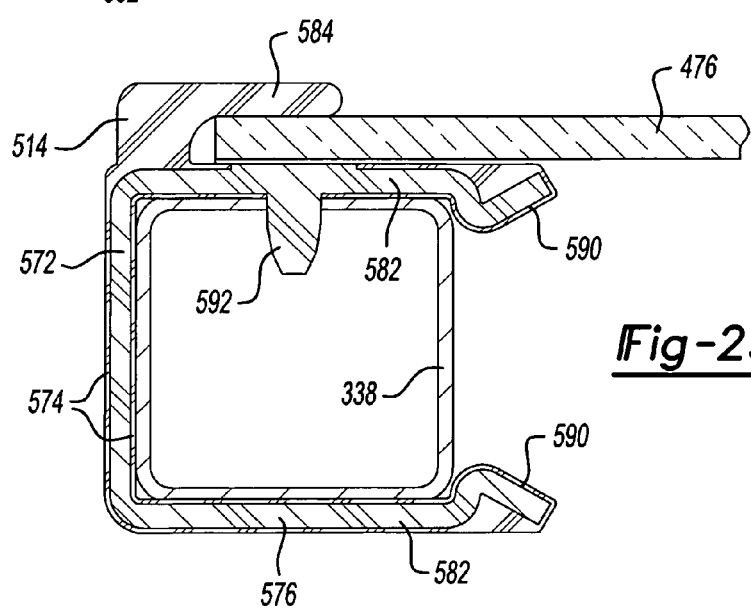

WINDSHIELD ATTACHMENT

CROSS-REFERENCE TO RELATED APPLICATIONS

This application is a continuation-in-part of U.S. patent application Ser. No. 11/120,869 filed on May 3, 2005. The disclosure of the above application is incorporated herein by reference.

FIELD

The present invention relates to golf cars and to a front windshield assembly for a golf car.

BACKGROUND

The statements in this section merely provide background information related to the present disclosure and may not constitute prior art.

Golf cars provide transportation for golfers around a golf course. In addition, a golf car must also securely carry a golf bag in a location for convenient access throughout a round of golf. Many golf cars are equipped with a front windshield assembly for providing a transparent barrier to the passengers of the golf car. A front windshield can protect the passengers from weather, debris, and other objects such as insects and golf balls, for example. In one configuration, a front windshield assembly is attached between a pair of upwardly extending struts arranged on a front end of the golf car. The struts define a window frame and typically connect with a roof structure of the golf car. In other arrangements, the window frame may be free standing at an upper end.

Some windshield assemblies on golf cars provide a two-part collapsible window pane arrangement. Typically, a pair of window panes may include an upper pane and a lower pane. The upper and lower panes may be arranged one on top of the other in a vertical orientation. In one arrangement, a flexible coupling member may connect the upper and lower pane together. In such an arrangement, the upper pane may be movable from an upright position to a collapsed position. In a collapsed position, the upper pane may pivot about the flexible coupling member to a position alongside the lower pane. As a result, a passage is formed through the window frame for air to freely pass.

In another configuration, a three pane window arrangement may be provided. In such an arrangement, a flexible coupling member may connect two of the windows such as the lower and intermediate pane together. The intermediate pane may be movable from an upright position to a collapsed position.

For each of the two pane and three pane windshield configurations, it is necessary to selectively retain the respective panes against the struts while in the upright and collapsed position. In one non-limiting example, retaining members may be used to capture the respective panes against the struts. In this regard, it is also necessary to provide retaining members that allow a user easy manipulation of the panes when moving between upright and collapsed positions.

In one non-limiting example, retaining members may be formed exclusively of extruded elastomeric material. In some instances, forming retaining members from extruded elastomeric material results in retaining members having a substantially constant cross-section. Typically, an extruded elastomeric retaining member having a consistent cross section may offer uniform stress resistance across the body of the retaining member. In some applications however, it would be desirable to configure a retaining member to provide additional strength at critical areas about its geometry.

SUMMARY

A window assembly cooperating with a window frame on a golf car includes a first window pane selectively coupled to the window frame. A second window pane is selectively coupled to the window frame and offset from the first window pane. A first pair of retaining members are arranged on the window frame in an installed position and movable between a retaining position wherein the retaining members retain the first window pane in an upright position and a release position wherein the retaining members are disengaged from the first window pane. Each of the first pair of retaining members are defined by a rigid frame having an integrally molded elastomeric body.

The window frame defines a pair of generally upright strut. Each frame is configured to cooperatively mate with the respective struts in the installed position. Each rigid frame defines an integrally formed protrusion adapted to be received by respective apertures defined in the respective struts in the installed position. The elastomeric body is molded around an inboard face of the rigid frame thereby forming an elastomeric barrier in the installed position between the respective rigid frames and the respective struts. The elastomeric body defines hook portions operable to securably engage an outboard face of the first window pane in the upright position.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DRAWINGS

The present invention will become more fully understood from the detailed description and the accompanying drawings, wherein:

FIG. 20 is a front perspective view of a first retaining member adapted to cooperate with the intermediate and lower windshields in the collapsed position of FIG. 18 according to some embodiments;

FIG. 21 is a side perspective view of the first retaining member of FIG. 20;

FIG. 22 is a sectional view of the first retaining member taken along line 22-22 of FIG. 17;

FIG. 23 is a front perspective view of a second retaining member adapted to cooperate with the intermediate windshield in the upright position of FIG. 17 according to various embodiments;

FIG. 24 is a side perspective view of the second retaining member of FIG. 23; and FIG. 25 is a sectional view of the second retaining member taken along line 25-25 of FIG. 17.

DETAILED DESCRIPTION

The following description of the preferred embodiment(s) is merely exemplary in nature and is in no way intended to limit the invention, its application, or uses.

Figure 1:
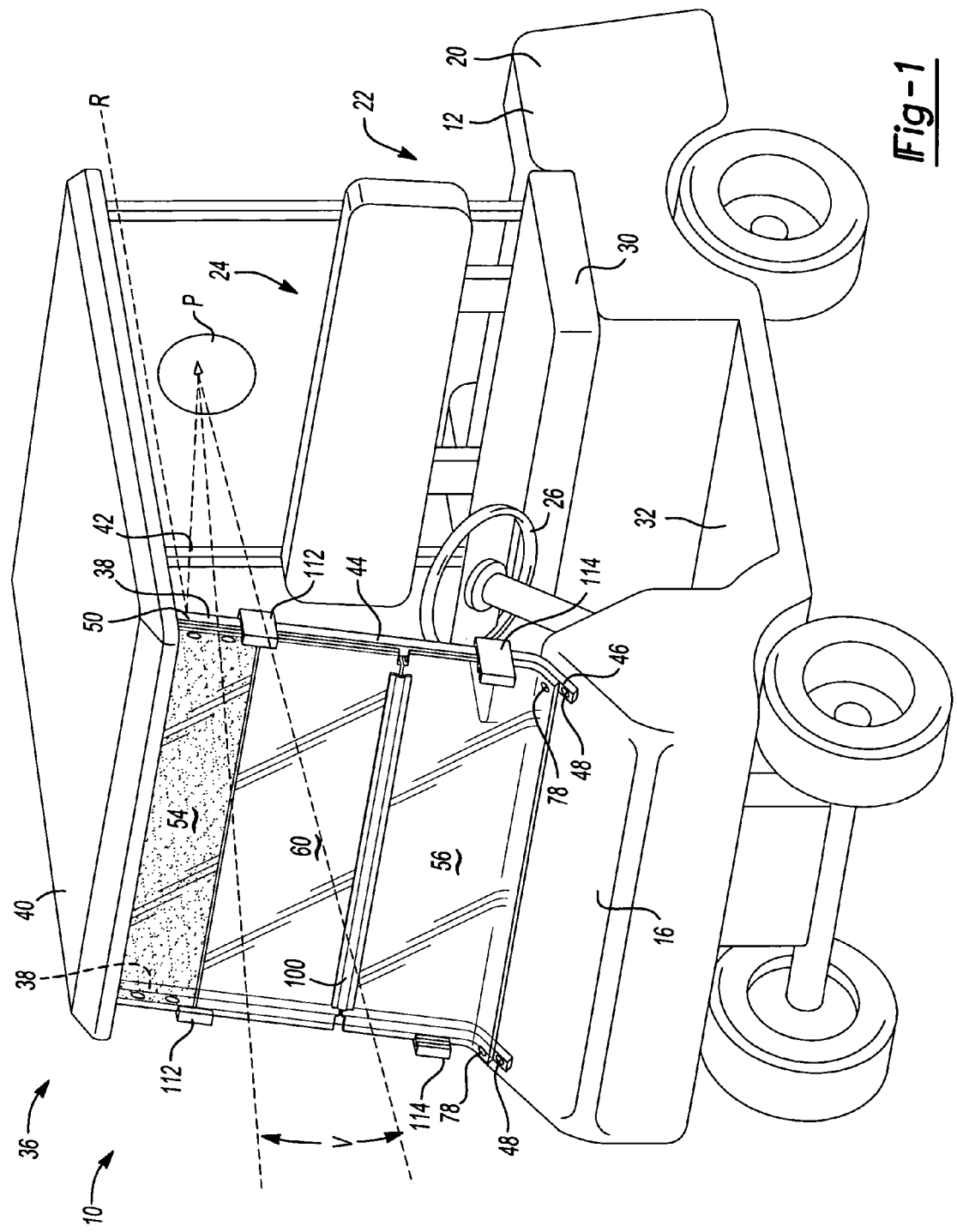
FIG. 1 is a perspective view of an exemplary golf car having a three pane windshield assembly according to various embodiments.

With initial reference to FIG. 1, a three pane windshield assembly constructed in accordance to the present teachings is shown and identified generally at reference 10. The three pane windshield assembly is illustrated operably connected to an exemplary golf car 12. It is appreciated that the golf car 12 is merely exemplary and that the multiple pane windshield assembly 10 may be adapted for use with other golf car configurations. Furthermore, the multiple pane windshield assembly described herein is not limited for use with golf cars and may also be used with other vehicles such as, but not limited to, utility vehicles, lawnmowers and other turf care vehicles.

The golf car 12 generally includes a front end 16, a rear end 20 having a golf bag storage area 22, and a passenger seating area 24. The passenger seating area 24 may include a steering wheel 26, accelerator and brake pedals (not shown), a seat 30, and a floor portion 32. The golf car 12 further includes an overhead assembly 36. The overhead assembly 36 generally includes a pair of front struts 38 supporting the three pane windshield assembly 10. The overhead assembly 36 may be interconnected between the front end 16 of the golf car 12 and a roof portion 40. A pair of rear struts 42 extend between the rear end 20 of the golf car 12 and the roof portion 40. The overhead assembly 36 provides protection for the vehicle passengers from the sun, but in some embodiments can protect against weather, debris, and other objects.

The pair of front struts 38 collectively define a window frame 44. A lower end 46 of the window frame 44 may be secured mechanically to the front end 16 of the golf car 12 such as by conventional fasteners 48. An upper end 50 of the window frame 44 may likewise secure mechanically to the roof 40 of the golf car 12. It is appreciated that alternatively, the front and rear struts 38 and 42, respectively, may be integrally formed and collectively define an intermediate frame (not shown) extending along an underside of the roof 40. Other fastening arrangements for the upper end 50 and the lower end 46 of the window frame 44 are also contemplated. The lower end 46 of the window frame 44 defines a curved portion for cooperating with the geometry of the front end 16 of the golf car 12. The window frame 44 may be comprised of a rigid material such as metal or plastic.

Figure 2:
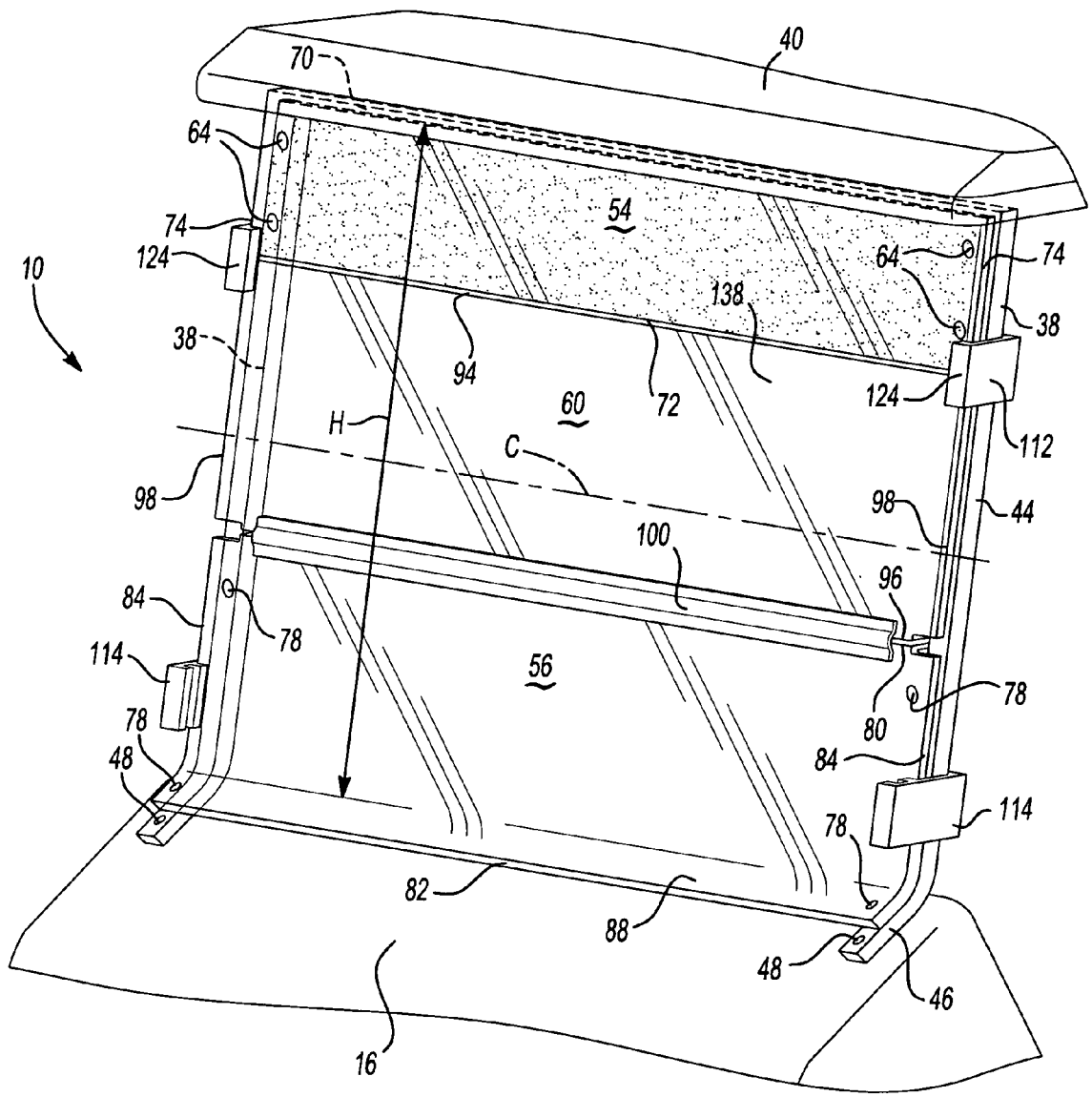
FIG. 2 is an enlarged perspective view of the three pane windshield assembly of FIG. 1 shown in an upright position.

With continued reference to FIG. 1 and further reference to FIG. 2, the three pane windshield assembly 10 will be described in greater detail. The three pane windshield assembly 10 includes a first or upper window pane 54, a second or lower window pane 56, and a third or intermediate window pane 60. The upper window pane 54 defines a planar section. The upper window pane 54 is secured to the window frame 44 and arranged adjacent to the roof portion 40. In one non-limiting example, the upper window pane 54 is secured to the window frame 44 by way of conventional fasteners 64. Other fastening arrangements may be employed. The upper window pane 54 defines a top lateral edge 70, a bottom lateral edge 72, and a pair of side edges 74.

Figure 3:
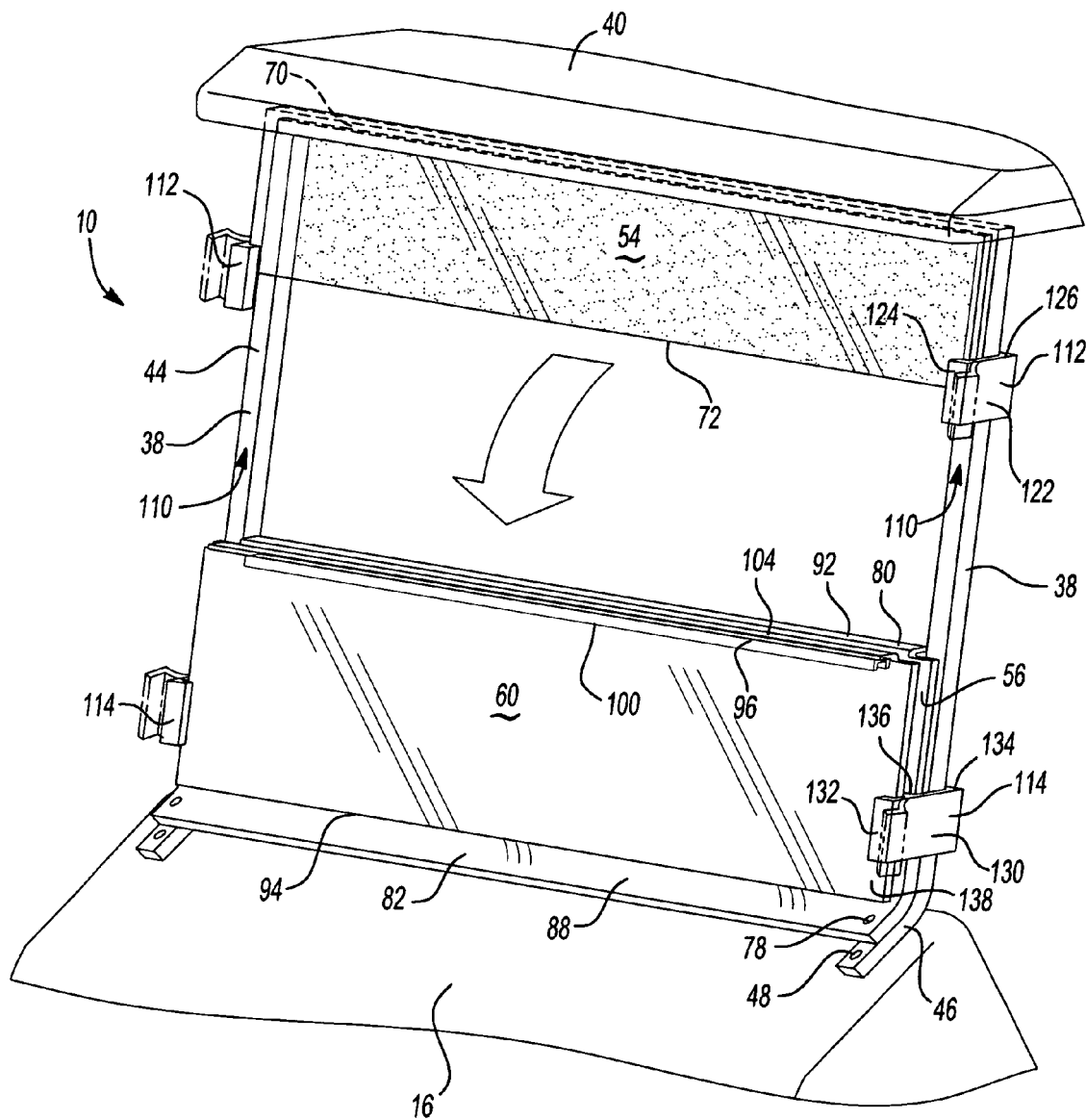
FIG. 3 is an enlarged perspective view of the three pane windshield assembly of FIG. 2 shown in a collapsed position.

The lower window pane 56 is secured to the window frame 44 and arranged adjacent to the front end. In one non-limiting example, the lower window pane 56 is secured to the window frame 44 by way of conventional fasteners 78, although other fastening arrangements are contemplated. The lower window pane 56 defines a top lateral edge 80, a bottom lateral edge 82, and a pair of side edges 84. A lower portion 88 of the lower window pane 56 defines a curved section adapted to cooperate with the curved portion of the lower end 46 of the window frame 44. It is appreciated that the bottom lateral edge 82 of the lower window pane 56 may alternatively terminate at the curved portion of the window frame. As a result, the lower pane may alternatively define a planar section. As illustrated in FIG. 3, the top lateral edge 80 defines a curved flange 92. The curved flange 92 provides additional structural support to the lower window pane 56.

The intermediate window pane 60 defines a planar section extending between the front struts 38. The intermediate window pane 60 defines a first end 94, a second end 96, and opposite sides 98. In an upright position (FIG. 2), the intermediate window pane 60 is bordered on the first end 94 by the upper window pane 54 and bordered on the second end 96 by the lower window pane 56. A flexible coupling member 100 operably connects the intermediate and lower window panes 60 and 56, respectively. The flexible coupling member 100 is attached to the second end 96 of the intermediate window pane 60 and the top lateral edge 80 of the lower window pane 56. The second end 96 of the intermediate window pane 60 defines a curved flange 104 (FIG. 3). The curved flange 104 provides additional structural support to the intermediate window pane 60. The curved flanges 92 and 104 each lie inboard of the front struts 38.

As will be described, the flexible coupling member 100 is adapted to provide a pivot axis whereby the intermediate window pane 60 may be moved from the upright position (FIG. 2) to a collapsed position (FIG. 3). The flexible coupling member 100 may be made from a durable resilient material such as rubber. The flexible coupling member 100 may be attached to the intermediate and lower window panes 60 and 56, respectively, by a press-fit, mechanical fasteners, or chemical bonding for example.

The three piece windshield assembly 10 is supported by the window frame 44. More specifically, the window frame 44 collectively defines a pair of forward mounting surfaces 110. The upper, lower, and intermediate window panes 54, 56, and 60 are configured adjacent to forward mounting surfaces 110. A first and second pair of retaining members 112 and 114, respectively, are coupled to the window frame 44. The first pair of retaining members 112 generally define a C-shaped body portion 122 including a forward hook portion 124 and a rearward hook portion 126. The second pair of retaining members 114 generally define an M-shaped body portion 130 including a forward hook portion 132, a rearward hook portion 134 and an intermediate finger portion 136. The first and second pair of retaining members 112 and 114, respectively, are operable to securely capture the intermediate window pane 60 at the upright position (retaining members 112, FIG. 3) and the collapsed position (retaining members 114, FIG. 4).

The first pair of retaining members 112 are arranged on the window frame 44 to align with an upper portion 138 of the intermediate window pane 60 in the upright position. More specifically, the forward hook portions 124 are aligned to capture the intermediate window pane 60 against the forward mounting surfaces 110 of the window frame 44 in the upright position (FIG. 2). The second pair of retaining members 114 are arranged on the window frame 44 to align with the upper portion 138 of the intermediate window pane 60 in the collapsed position (FIG. 3). More specifically, the forward hook portions 132 are aligned to capture the intermediate window pane 60 against the intermediate finger portion 136. The first and second pair of retaining members 112 and 114, respectively, may be made from flexible, resilient material such as, but not limited to rubber.

Movement of the intermediate window pane 60 from the upright position to the collapsed position will now be described in greater detail. At the outset, the first pair of retaining members 112 are pulled outwardly at the forward hook portions 124 to a position (represented in phantom line) allowing the intermediate window pane 60 to clear the first pair of retaining members 112. Once the intermediate window pane 60 clears the first pair of retaining members 112, they may be released to their relaxed position (represented in solid line).

Next, the intermediate window pane 60 rotates generally about the flexible coupling member 100 and is captured by the second pair of retaining members 114. In one non-limiting example, the second pair of retaining members 114 may be flexed outwardly (represented in phantom line) to accept the intermediate window pane 60 between the forward hook portions 132 and intermediate finger portions 136. The second pair of retaining members 114 may then be released causing the intermediate window pane 60 to nest between the forward hook portions 132 and the intermediate finger portions 136 (represented in solid line).

Returning now to FIG. 1, the three pane windshield assembly 10 provides favorable viewing advantages. For example, as shown, a passenger P has a visibility range V through the intermediate window pane 60, unimpeded by a window seam, window transition, or other barrier. Explained further, a vertical height H (FIG. 2) defines a vertical viewing space. A centerline C defines a horizontal line through a midpoint of the height H. As shown, the respective transitions between adjacent windows 54, 56, and 60 are offset from the centerline C for improved visibility. The upper window pane 54 may be coated with a reflective layer allowing the passenger P to view in a rearward direction R. In one non-limiting example, the upper window pane 54 may be manufactured to allow both forward vision and rearward vision concurrently. Additionally, or alternatively, the upper window pane 54 may be tinted. In one non-limiting example, each window pane 54, 56 and 60 may be made of durable plastic.

Figure 4:
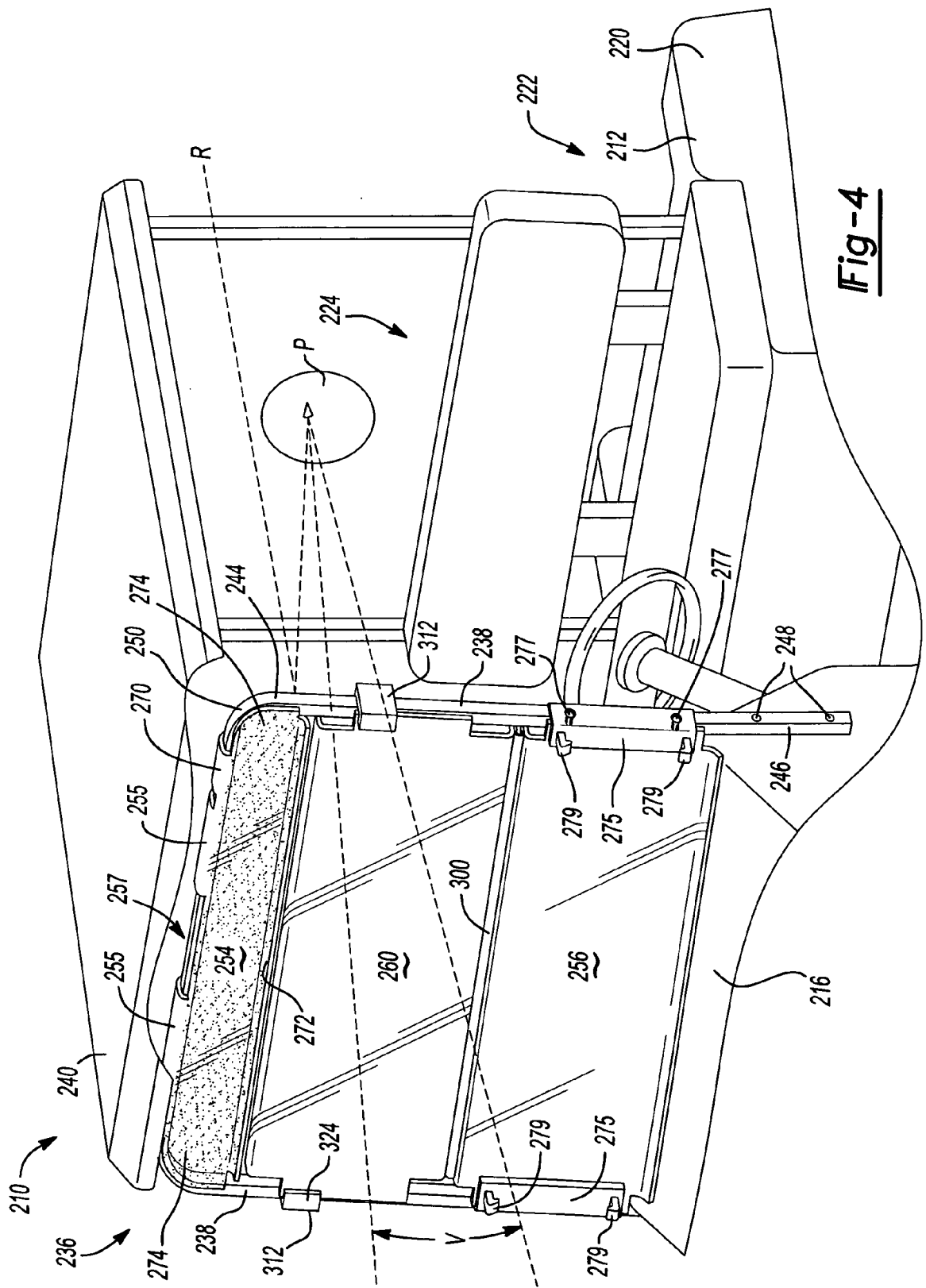
FIG. 4 is a perspective view of an exemplary golf car having a three pane windshield assembly according to some embodiments.
Figure 5:
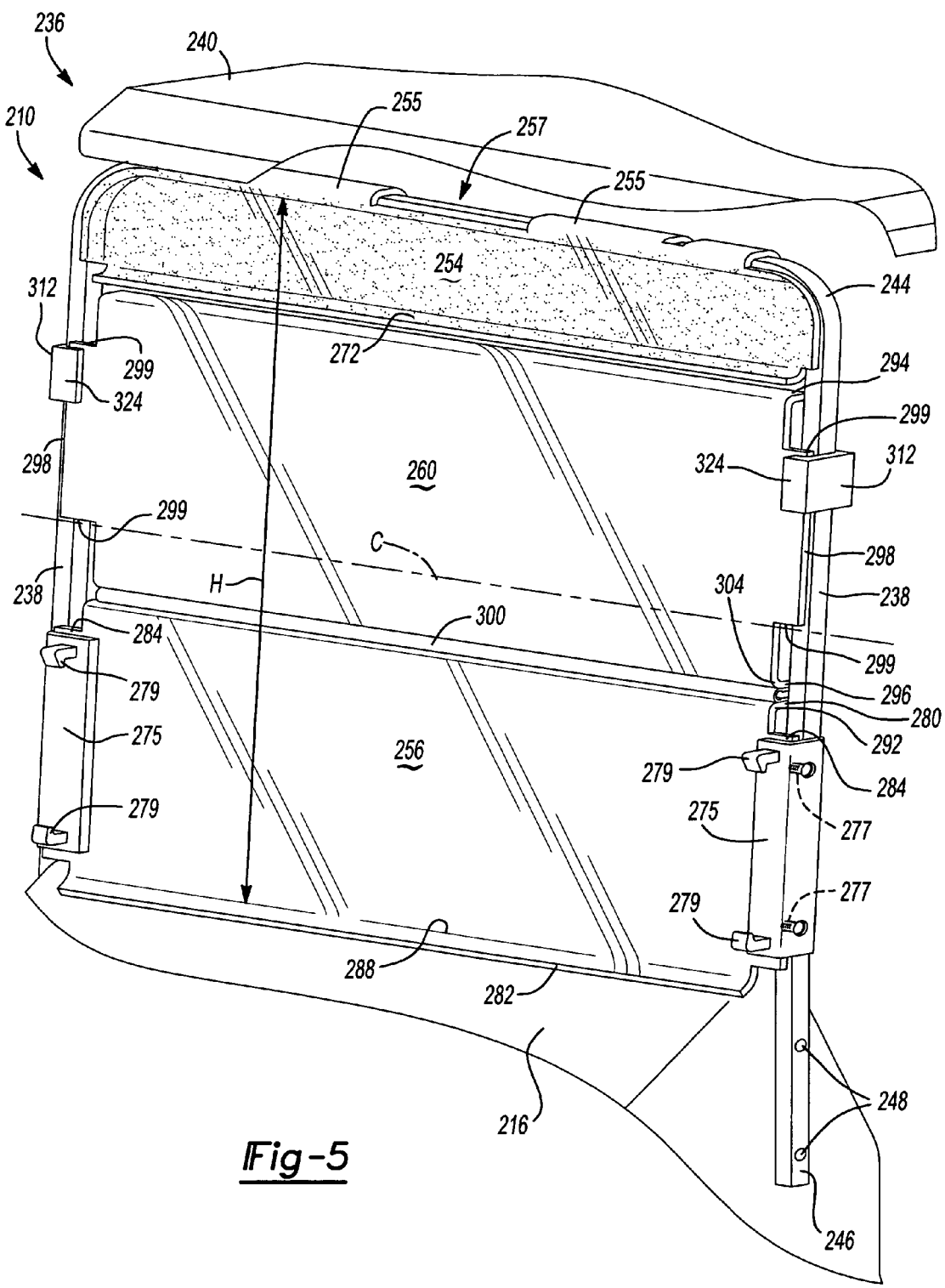
FIG. 5 is an enlarged perspective view of the three pane windshield assembly of FIG. 4 shown in an upright position.
Figure 6:
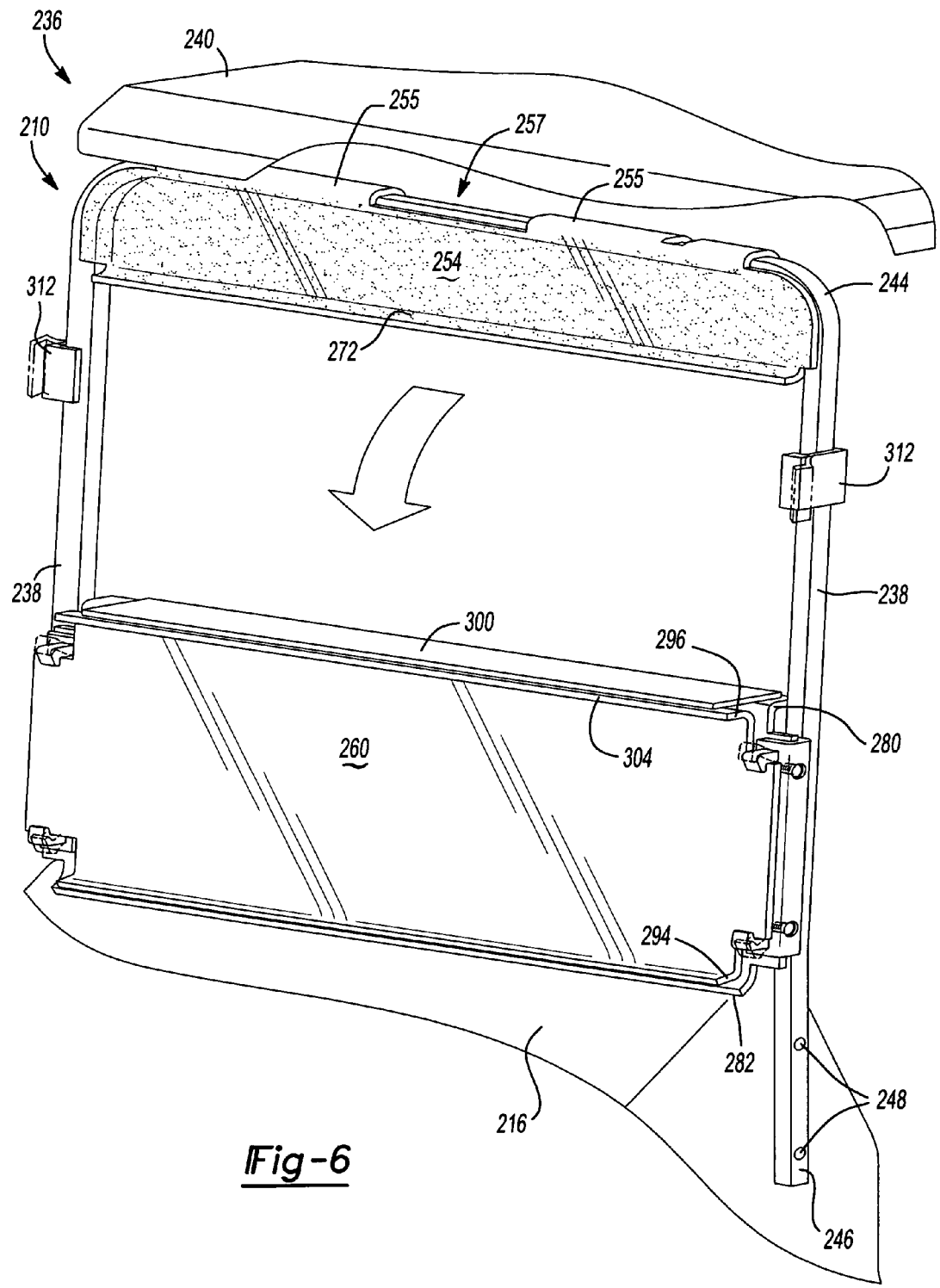
FIG. 6 is an enlarged perspective view of the three pane windshield assembly of FIG. 5 shown in a collapsed position.

With reference now to FIGS. 4-6, a three pane windshield assembly 210 constructed according to additional features of the present invention will be described. For simplicity, similar features associated with the three pane windshield assembly 210 will include reference numerals increased by 200 from the three pane windshield assembly 10 described above.

The three pane windshield assembly 210 is illustrated operably connected to an exemplary golf car 212. The golf car 212 generally includes a front end 216, a rear end 220 having a golf bag storage area 222, and a passenger cabin area 224. Again, it is appreciated that the golf car 212 is merely exemplary and that the three pane windshield assembly 210 may be adapted for use with other golf car configurations. The golf car 212 includes an overhead assembly 236. The overhead assembly 236 generally includes a pair of front struts 238 supporting the three pane windshield assembly 210.

The pair of front struts 238 collectively define a window frame 244. A lower end 246 of the window frame 244 may be secured mechanically to the golf car 212 such as by conventional fasteners 248. An upper end 250 of the window frame 244 may likewise secure mechanically to the roof 240 of the golf car 212. The lower end 246 of the window frame 244 defines a generally linear portion for cooperating with the geometry of the golf car 212.

With continued reference to FIG. 4 and further reference to FIG. 5, the three pane windshield assembly 210 will be described in greater detail. The three pane windshield assembly 210 includes a first or upper window pane 254, a second or lower window pane 256 and a third or intermediate window pane 260. The upper window pane 254 defines a pair of C-channel portions 255 integrally formed thereon. The C-channel portions 255 cooperate to form a friction fit around the upper portion of the window frame 244. A gap 257 is defined between the C-channel portions 255 for accommodating a sign holder or other identifier (not specifically shown). The C-channel portions 255 are formed on a top lateral edge 270 of the upper window pane 254. The upper window pane 254 further defines a bottom lateral edge 272 and a pair of side edges 274. As shown, the bottom lateral edge 272 defines a curved section for increased stability.

The lower window pane 256 is secured to the window frame 244 by a pair of retaining members or windshield supports 275. The windshield supports 275 are secured to the window frame 244 by fasteners such as push pins 277 to capture the lower window pane 256 against the window frame 244. A pair of compliant hook portions 279 are arranged along a front face of each windshield support 275. As will be described in detail, the hook members 279 are adapted to capture the intermediate window pane 260 in the collapsed position. The windshield supports 275 are symmetric and may be used on either side of the window frame 244. The windshield supports 275 may comprise a durable lightweight material such as plastic for example.

The lower window pane 256 defines a top lateral edge 280 (FIG. 5), a bottom lateral edge 282 and a pair of side edges 284. A lower portion 288 of the lower window pane 256 defines a curved section for increased stability. Similarly, the top lateral edge 280 defines a curved flange 292.

With particular reference to FIG. 5, the intermediate window pane 260 defines a planar section extending between the front struts 238. The intermediate window pane defines a curved flange at a first end 294, a second end 296 and opposite sides 298. In an upright position (FIG. 5), the intermediate window pane 260 is bordered on the first end 294 by the upper window pane 254 and bordered on the second end 296 by the lower window pane 256. The opposite sides 298 define notch portions 299 for receiving the hook portions 279 in the collapsed position (FIG. 6). A flexible coupling member 300 is attached to the second end 296 of the intermediate window pane 260 and the top lateral edge 280 of the lower window pane 56. The second end 296 of the intermediate window pane 260 defines a curved flange 304. The curved flanges 292, 294, and 304 each lie inboard of the front struts 238.

Movement of the intermediate window pane 260 from the upright position to the collapsed position will now be described in greater detail. At the outset, the retaining members 312 are pulled outwardly at the forward hook portions 324 to a position (represented in phantom line) allowing the intermediate window pane 260 to clear the retaining members 312.

Next, the intermediate window pane 260 rotates generally about the flexible coupling member 300 and is captured by the hook portions 279. In one non-limiting example, the hook portions 279 may be flexed outwardly (represented in phantom line) to accept the intermediate window pane 260 at the notch portions 299. In another non-limiting example, the angled surfaces of the hook portions 279 may influence the hook portions 279 to bias outwardly upon pressing the intermediate window pane 260 therebetween.

Returning now to FIG. 4, the three pane windshield assembly 210 provides the favorable viewing advantages as described in relation to the there pane windshield assembly 10. More specifically, a passenger P has a visibility range V through the intermediate window pane 260. Furthermore, the upper window pane 254 may be coated with a reflective layer allowing the passenger P to view in a rearward direction R. In one non-limiting example, each window pane 254, 256 and 260 may be made of durable plastic.

With reference now to FIGS. 7-16, a two pane windshield assembly 330 according to various embodiments. The two pane windshield assembly 330 is shown cooperating with a golf car 332 having an overhead assembly 336. The overhead assembly 336 generally includes a pair of front struts 338 supporting the two pane windshield assembly 330. The overhead assembly 336 may be interconnected between a front end 340 of the golf car 332 and a roof portion 342. A pair of rear struts (not shown) may extend between a rear end of the golf car 332 and the roof portion 342.

The pair of front struts 338 collectively define a window frame 344. A lower end 346 (FIG. 9) of the window frame 344 may be secured mechanically to the front end 340 of the golf car 332. An upper end of the window frame 348 may likewise secure mechanically to the roof 342 of the golf car 332. The lower end 346 of the window frame 344 may define a curved portion for cooperating with the geometry of the front end 340 of the golf car 332. The window frame 344 may be formed of a rigid material such as metal or plastic.

With specific reference to FIGS. 7-10, the two pane windshield assembly 330 will be described in greater detail. The two pane windshield assembly 330 includes a first or upper window pane 350 and a second or lower window pane 352. The upper window pane 350 is selectively secured to the window frame 344 by way of a first pair of retaining members 356. The upper window pane 350 defines a top curved flange 360, a bottom curved flange 362, and a pair of side edges 364.

Figure 9:
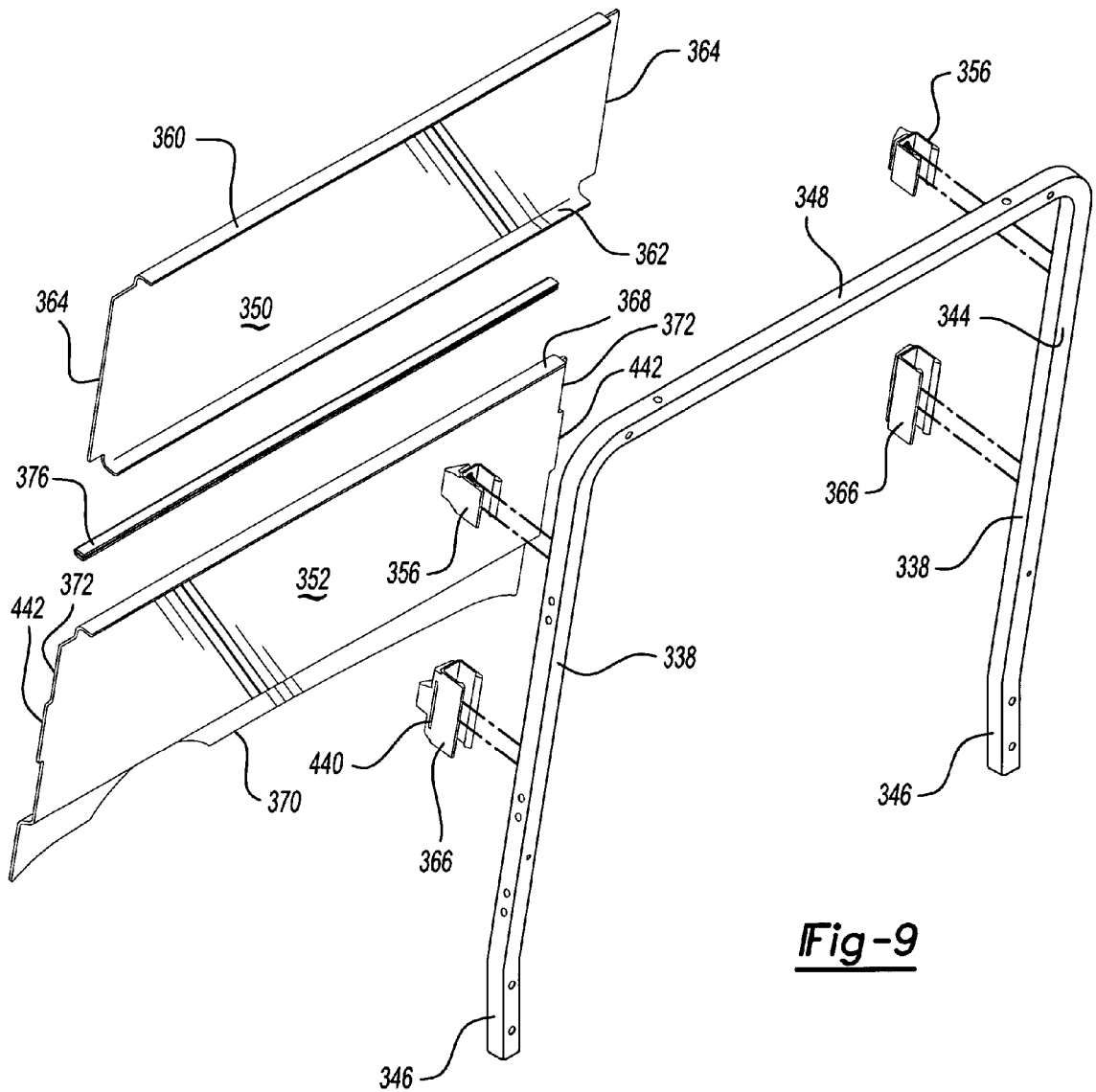
FIG. 9 is an exploded rear perspective view of the two pane windshield assembly of FIG. 7.

The lower window pane 352 is secured to the window frame 344 and arranged adjacent to the front end 340. In one non-limiting example, the lower window pane 352 may be secured to the window frame 344 by way of a second pair of retaining members 366. The lower window pane 352 defines a top lateral edge 368 (FIG. 9), a bottom edge 370, and a pair of side edges 372. It is appreciated that the bottom edge 370 of the lower window pane 352 may alternatively terminate at a curved lateral edge similar to that shown in FIG. 2. In another non-limiting example, the lower window pane 352 may alternatively define a planar section. As illustrated in FIG. 9, the top lateral edge 368 defines an upper curved flange. The curved flange provides additional structural support to the lower window pane 352.

Figure 7:
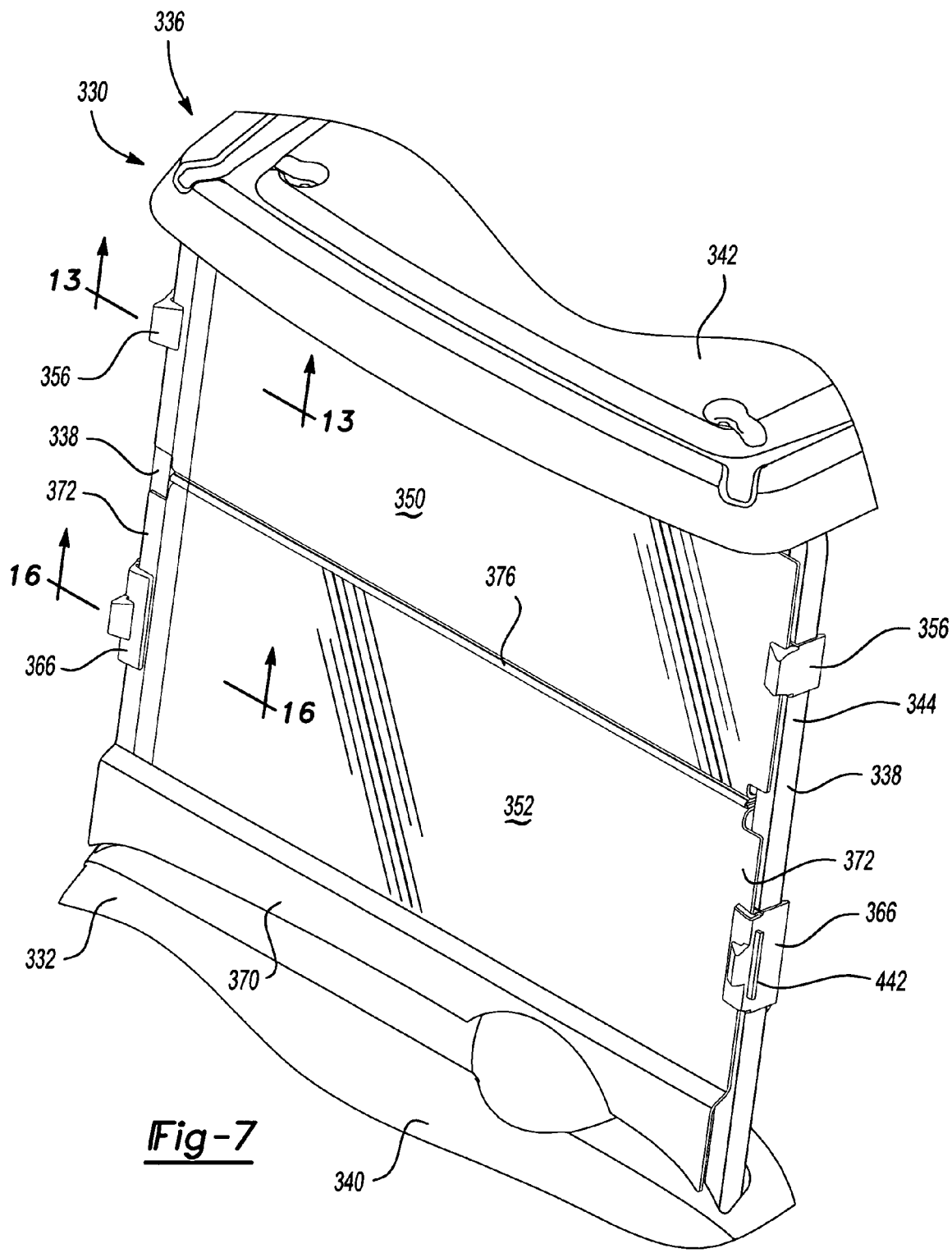
FIG. 7 is a perspective view of an exemplary two pane windshield assembly shown in an upright position.
Figure 8:
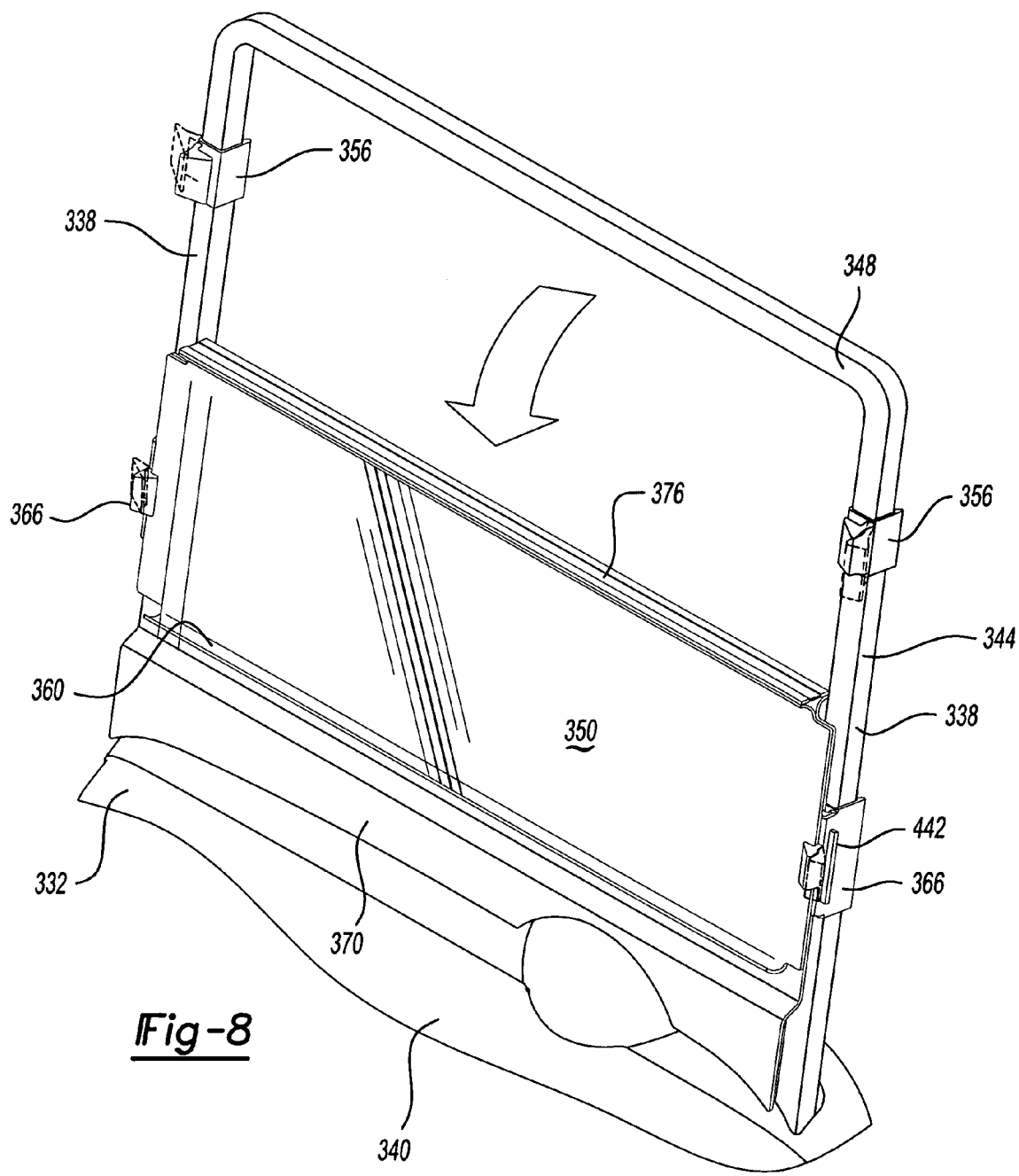
FIG. 8 is a perspective view of the two pane windshield assembly of FIG. 7 shown in a collapsed position.

A flexible member 376 operably connects the upper and lower window panes 350 and 352, respectively. The flexible member 376 may be attached to the bottom curved flange 352 of the upper window pane 350 and the upper curved flange 368 of the lower window pane. As will be described, the flexible coupling member 376 is adapted to provide a pivot axis whereby the upper window pane 350 may be moved from an upright position (FIG. 7) to a collapsed position (FIG. 8). The flexible coupling member 376 may be made from a durable resilient material such as rubber. The flexible coupling member 376 may be attached to the upper and lower window panes, 350 and 352, respectively, by a press-fit, mechanical fasteners, or chemical bonding for example.

Figure 11:
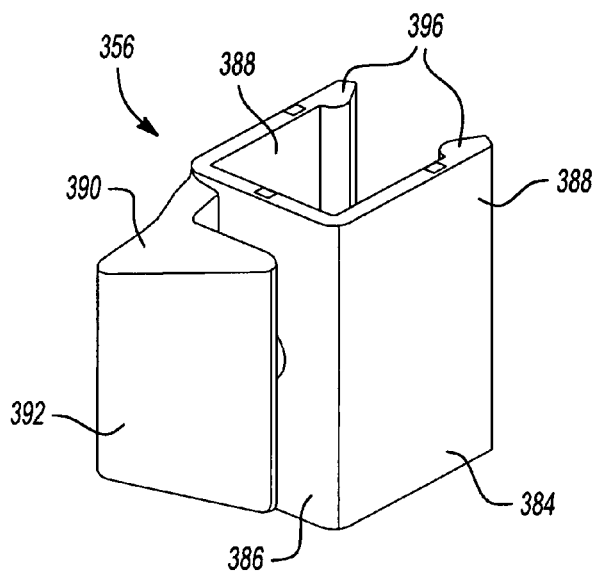
FIG. 11 is a front perspective view of a first retaining member adapted to cooperate with the upper windshield of FIG. 7 according to various embodiments.
Figure 12:
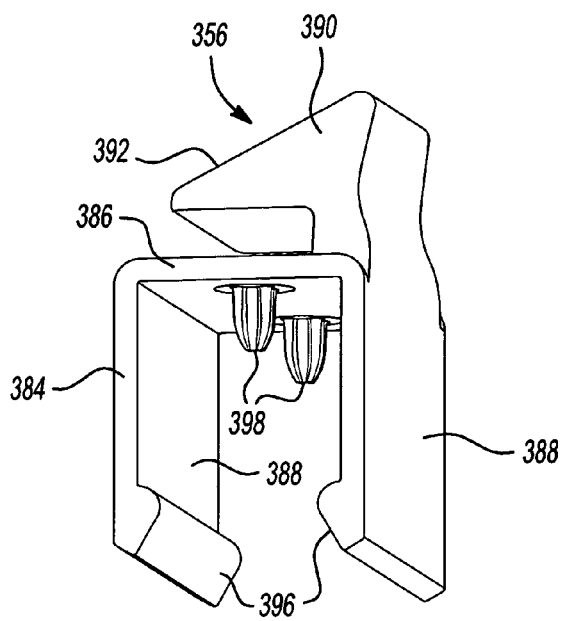
FIG. 12 is a side perspective view of the first retaining member of FIG. 11.
Figure 13:
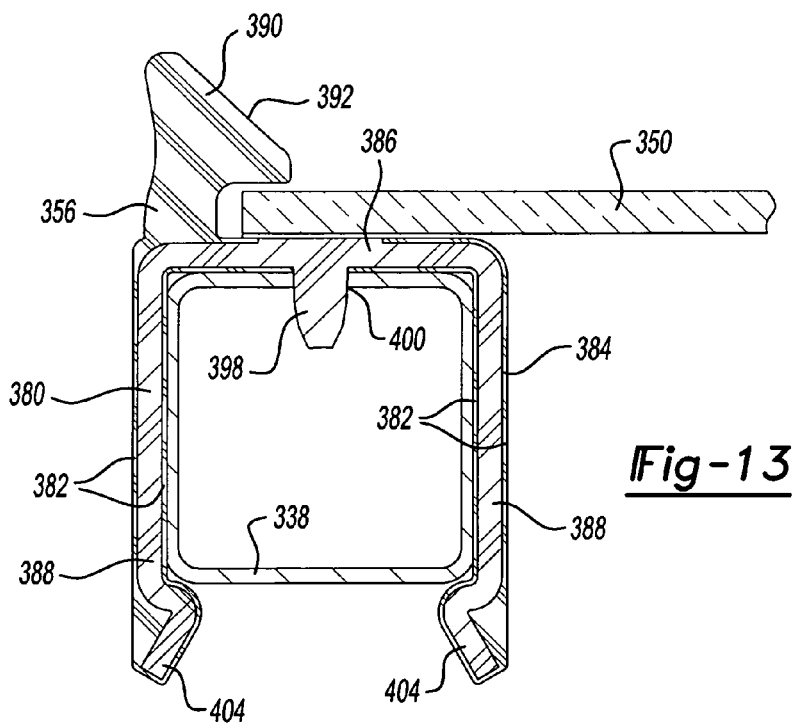
FIG. 13 is a sectional view of the first retaining member taken along line 13-13 of FIG. 7.

With specific reference now to FIGS. 11-13, the first pair of retaining members 356 will be described in greater detail. For simplicity, a single retaining member 356 is shown in FIGS. 11-13. The following discussion will be directed to one of the first pair of retaining members 356 on the front strut 338 shown in FIG. 7; however, it is appreciated that the same retaining member 356 may be adapted for use on the other front strut 338.

The first pair of retaining members 356 are formed of a rigid frame 380 having an integrally molded elastomeric body 382 (FIG. 13). In one non-limiting example, the rigid frame 380 may be overmolded with elastomeric material. The rigid frame 380 may be formed of plastic, metal or other rigid material. The elastomeric material forming the elastomeric body 382 may comprise rubber for example. The rigid frame 380 discourages cracking or splitting of the retaining member 356 and provides strength to the retaining members 356 as a whole.

Figure 10:
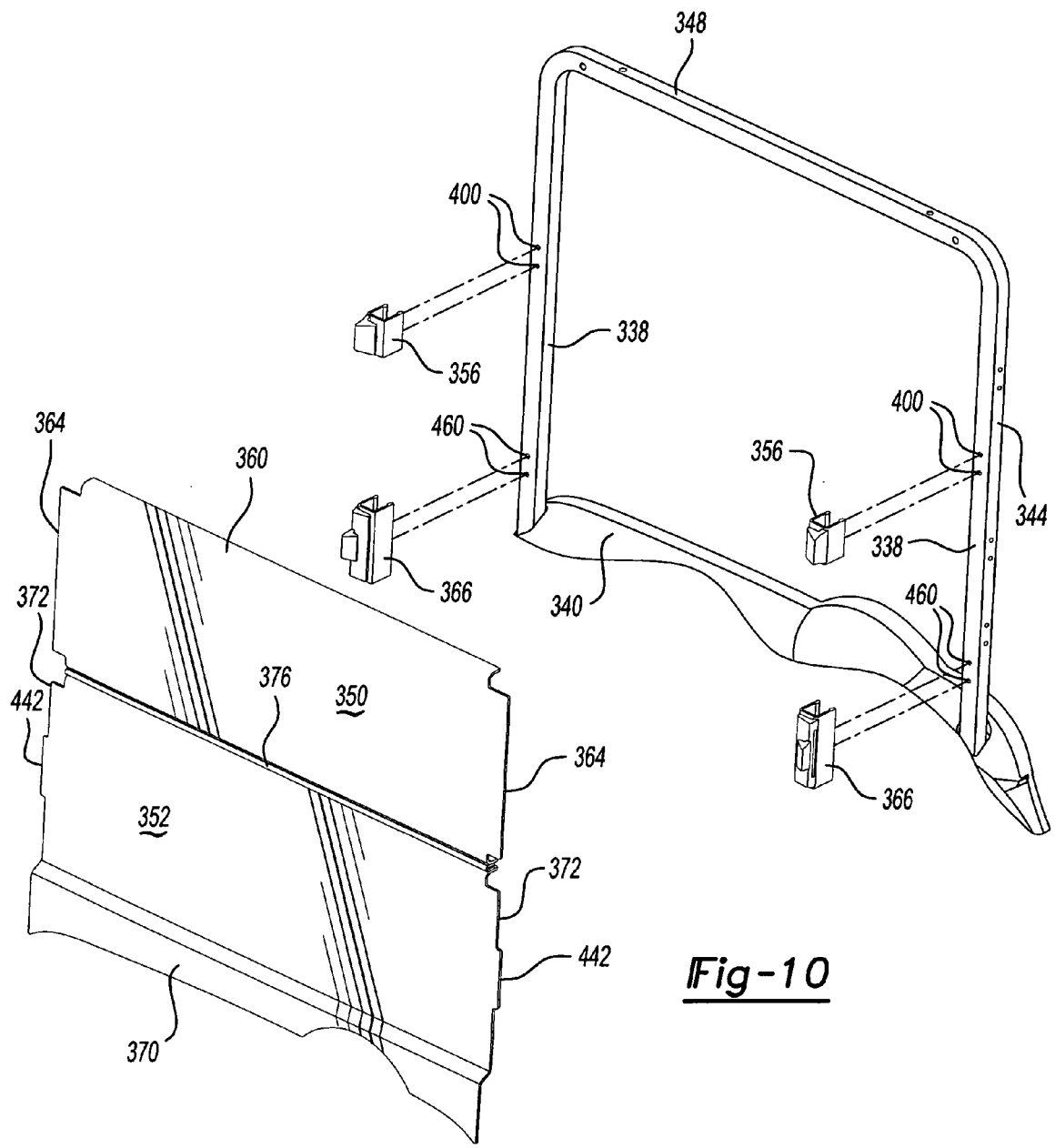
FIG. 10 is an exploded front perspective view of the two pane windshield assembly of FIG. 7.

The retaining member 356 defines a main body portion 384 having a central section 386 and a pair of opposing legs 388 collectively defining a U-channel. A hook portion 390 extends outboard from the central face 386 of the main body portion 384. The hook portion 390 defines a ramp 392 for facilitating cooperation with the upper window pane 350 when pivoting from a collapsed position to an upright position. The upper window pane 350 nests between the hook portion 390 and the central section 386 in the upright position (FIGS. 7 and 13). A pair of opposing tangs 396 are defined at terminal ends of the legs 388. The rigid frame 380 defines a pair of studs 398 extending generally parallel to the legs 388. The studs 398 are adapted to be received by a complementary pair of openings 400 defined in the strut 338 (FIG. 10). It is appreciated that one or more studs 398 may be provided on the retaining member 356. In this way, the retaining member 356 may be precluded from sliding along the strut 338 in an assembled position.

The rigid frame 380 (FIG. 13) further defines a pair of opposing heel portions 404. The heel portions 404 provide strength at the legs 388 and encourage a secure fit around the strut 338 in an installed position (FIG. 13). The heel portions 404 and, as a result, the legs 388 provide an inward taper to facilitate assembly of the retaining member 356 around the strut 338. It is appreciated that the legs 388 of the retaining member 356 provide a degree of flexibility such that when assembled to a strut 338, the legs 388 flex outwardly as the retaining member 356 is advanced downwardly (as viewed in FIG. 13) until the tangs 396 clear the strut 338. The cooperation of the stud 398 and the interaction of the legs 388 with the strut 338 provide a snap-fit for the retaining member 356. In this way, no supplemental fasteners are needed.

Figures 14, 15:
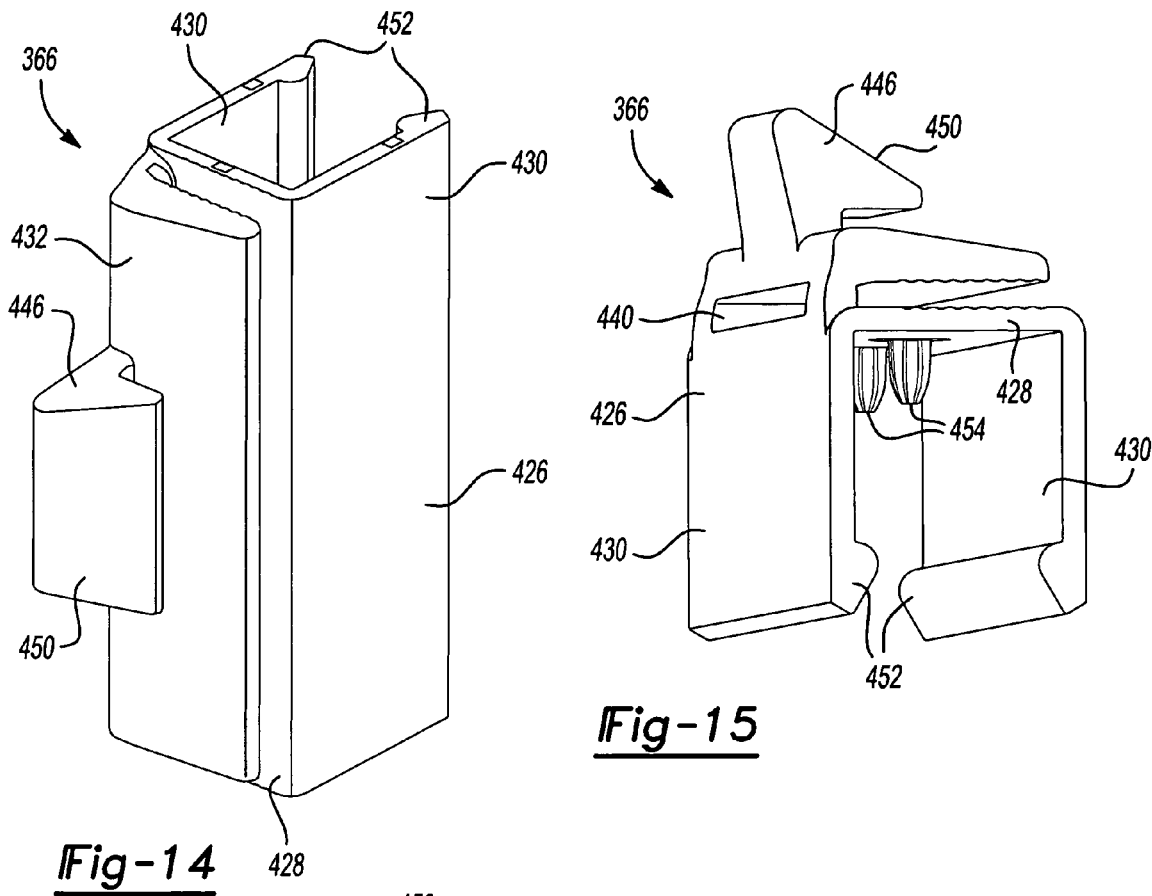
FIG. 14 is a front perspective view of a second retaining member adapted to cooperate with the lower windshield of FIG. 7 according to various embodiments.
FIG. 15 is a side perspective view of the second retaining member of FIG. 14.
Figure 16:
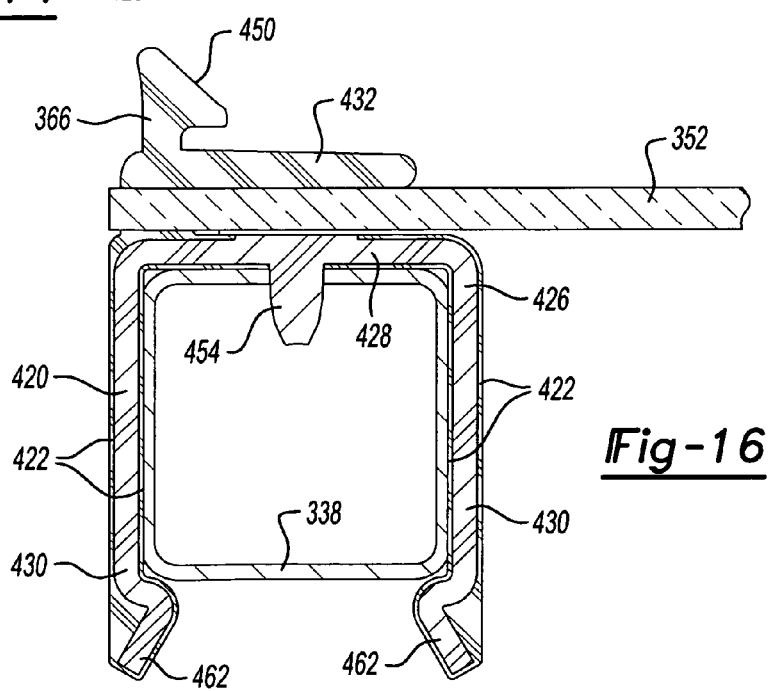
FIG. 16 is a sectional view of the second retaining member taken along line 16-16 of FIG. 7.

With specific reference now to FIGS. 14-16, the second pair of retaining members 366 will be described in greater detail. For simplicity, a single retaining member 366 is shown in FIGS. 14-16. The following discussion will be directed to one of the second pair of retaining members 366 on the front strut 338 shown in FIG. 7, however, it is appreciated that the same retaining member 366 may be adapted for use on the other front strut 338.

As with the first pair of retaining members 356, the second pair of retaining members 366 are formed of a rigid frame 420 having an integrally molded elastomeric body 422 (FIG. 16). The rigid frame 420 may be overmolded with elastomeric material. The rigid frame 420 may be formed of plastic, metal or other rigid material. The elastomeric material forming the elastomeric body 422 may comprise rubber for example.

In general, the retaining member 366 defines a main body portion 426 having a central section 428 and a pair of opposing legs 430 collectively defining a U-channel. An intermediate finger 432 extends from the central section 428. The intermediate finger 432 is adapted to capture the lower window pane 352 against the central section 428. The intermediate finger 432 and the central section 428 may define ribs for encouraging grip to the lower window pane 352. As best illustrated in FIG. 15, a passage 440 is defined on the retaining member 366. The passage 440 is operable to receive a tab 442 (FIG. 9) defined on the sides 372 of the lower window pane 352. As a result, the lower window pane 352 is precluded from advancing vertically along the strut 338.

A hook portion 446 extends outboard from the intermediate finger portion 432. The hook portion 446 defines a ramp 450 for facilitating cooperation with the upper window pane 350 when pivoting from an upright position to a collapsed position. The upper window pane 350 nests between the hook 446 and the intermediate finger portion 432 in the collapsed position (FIGS. 8 and 16). A pair of opposing tangs 452 are defined at terminal ends of the main body portion 426. The rigid frame 420 defines a pair of studs 454 extending generally parallel to the legs 430. The studs 454 are adapted to be received by a complementary pair of openings 460 defined in the strut 338 (FIG. 10). It is appreciated that one or more studs 454 may be provided on the retaining member 366. In this way, the retaining member 366 may be precluded from sliding along the strut 338 in an assembled position.

The rigid frame 420 further defines a pair of opposing heel portions 462. The heel portions 462 provide strength at the legs 430 and encourage a secure fit around the strut 338 in an installed position. The heel portions 462 and, as a result, the legs 430 provide an inward taper to facilitate assembly of the retaining member 366 around the strut 338. As with the first pair of retaining members 356, the legs 430 of the second pair of retaining members 366 provide a degree of flexibility to facilitate assembly to a strut 338. In this way, the legs 430 flex outwardly as the retaining member 366 is advanced downwardly (as viewed in FIG. 16) until the tangs 462 clear the strut 338. The cooperation of the stud 454 and the interaction of the legs 430 with the strut 338 provide a snap-fit for the retaining member 366. In this way, no supplemental fasteners are needed.

With specific reference now to FIGS. 8 and 13, movement of the upper window pane 350 from the upright position to the collapsed position will now be described in greater detail. At the outset, the first pair of retaining members 356 are pulled outwardly at the hook portions 390 to a position (represented in phantom line) allowing the upper window pane 350 to clear the first pair of retaining members 356. Once the upper window pane 350 clears the first pair of retaining members 356, they may be released to their relaxed position (represented in solid line).

Next, the upper window pane 350 rotates generally about the flexible coupling member 376 and is captured by the second pair of retaining members 366. In one non-limiting example, the second pair of retaining members 366 may be flexed outwardly (represented in phantom line) to accept the upper window pane 350 between the hook portions 446 and the intermediate finger portions 432. The second pair of retaining members 366 may then be released causing the upper window pane 350 to nest between the hook portions 446 and the intermediate finger portions 432 (represented in solid line).

With specific reference to FIGS. 17-25, a three pane windshield assembly 470 according to additional features will be described. For simplicity, the three pane windshield assembly 470 is shown cooperating with the golf car 332 and overhead assembly 336 as described in relation to FIGS. 7-10. As such, similar reference numerals will be used.

Figure 18:
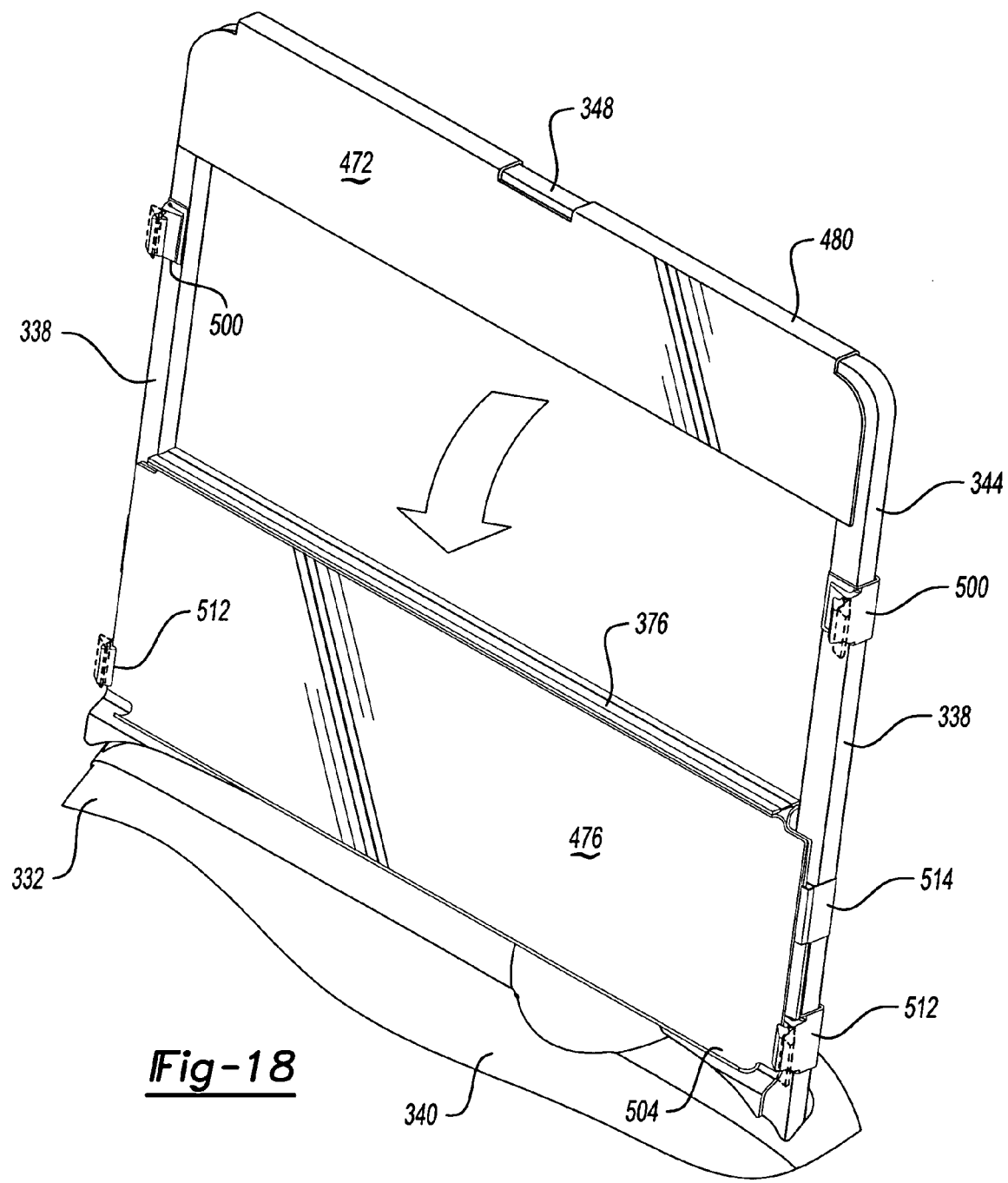
FIG. 18 is a perspective view of the three pane windshield assembly of FIG. 17 shown in a collapsed position.

The three pane windshield assembly 470 includes a first or upper window pane 472, a second or lower window pane 474, and a third or intermediate window pane 476. The upper window pane 472 is secured to the window frame 344 and arranged adjacent to the roof portion 342. In one non-limiting example, the upper window pane 472 may define a hook 480 along an upper edge for attaining a secure tolerance fit around the window frame 344 (FIG. 18). Alternatively, the upper window pane 472 may be secured to the window frame 344 by way of fasteners (see e.g., FIGS. 1 and 2). The intermediate window pane 476 is selectively secured to the window frame 344 by way of a first pair of retaining members 500. The intermediate window pane 476 defines a top curved flange 504 (FIG. 19), a bottom curved flange 506 and a pair of side edges 510.

Figure 19:
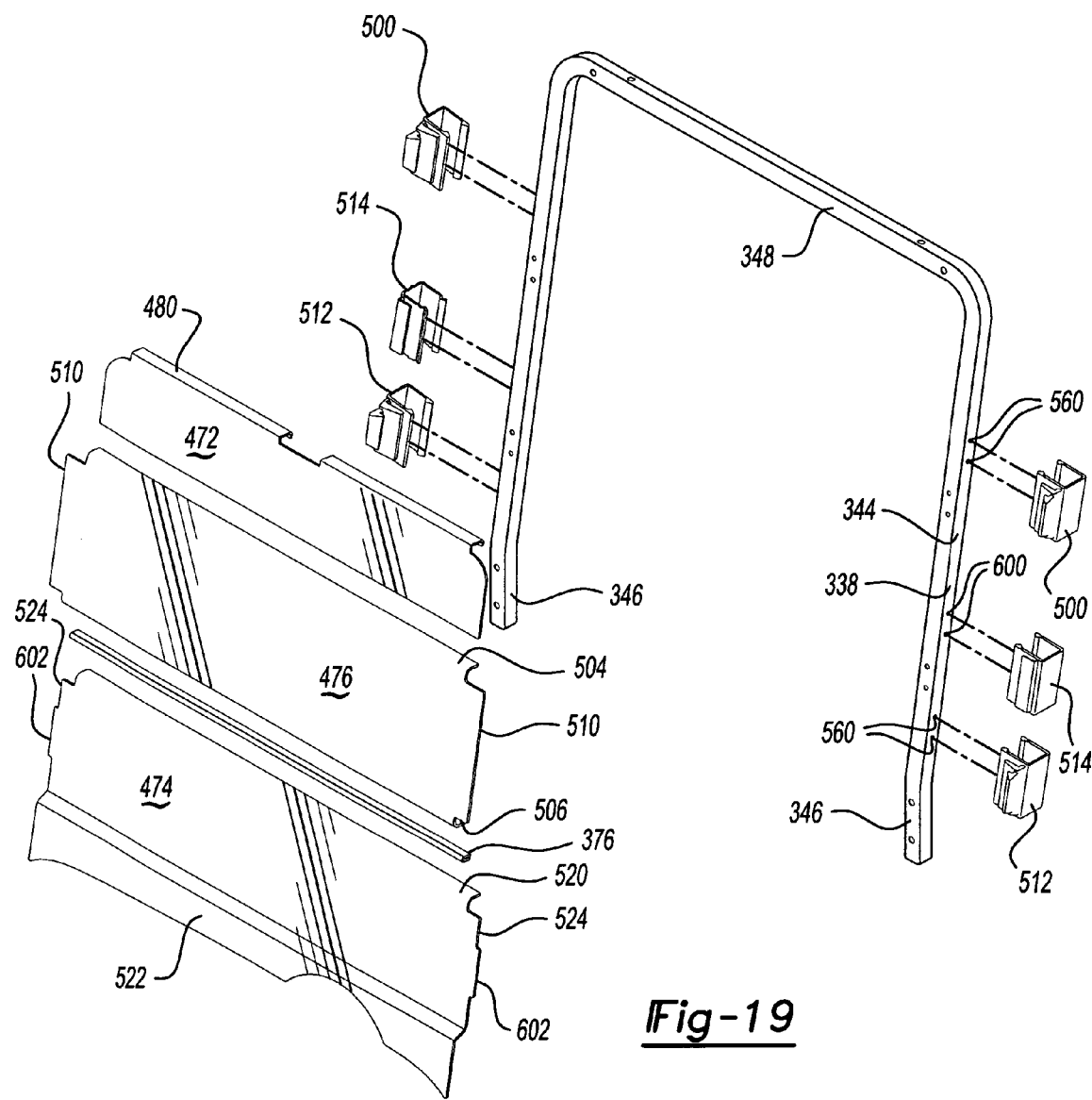
FIG. 19 is an exploded front perspective view of the three pane windshield assembly of FIG. 17.

The lower window pane 474 is secured to the window frame 344 and arranged adjacent to the front end 340. In one non-limiting example, the lower window pane 474 may be secured to the window frame 344 by way of a second and third pair of retaining members 512 and 514, respectively. The lower window pane 474 defines a top lateral edge 520, a bottom edge 522, and a pair of side edges 524. It is appreciated that the bottom edge 522 of the lower window pane 474 may alternatively terminate at the curved portion 346 of the window frame 344. As a result, the lower window pane 474 may alternatively define a planar section. As illustrated in FIG. 19, the top lateral edge 520 defines an upper curved flange. The curved flange provides additional structural support to the lower window pane 474.

A flexible member 376 operably connects the intermediate and lower window panes 476 and 474, respectively. The flexible member 376 may be attached to the bottom curved flange 506 of the intermediate window pane 476 and the upper curved flange 520 of the lower window pane 474. As will be described, the flexible coupling member 376 is adapted to provide a pivot axis whereby the intermediate window pane 476 may be moved from an upright position (FIG. 17) to a collapsed position (FIG. 18). The flexible coupling member 376 may be formed and coupled to the window assembly 470 consistent with the other flexible members 376 disclosed herein.

With specific reference now to FIGS. 20-22, the first and second pairs of retaining members 500 and 512, respectively, will be described in greater detail. Each retaining member of the first and second pair 500 and 512 is equivalent. As such, for simplicity, a single retaining member 500 is shown in FIGS. 20-22. The following discussion will be directed to one of the first pair of retaining members 500 on the front strut 338 shown in FIG. 17, however, it is appreciated that the same retaining member 500 may be adapted for use on the other front strut 338 and as either of the second pair of retaining members 512.

Figure 17:
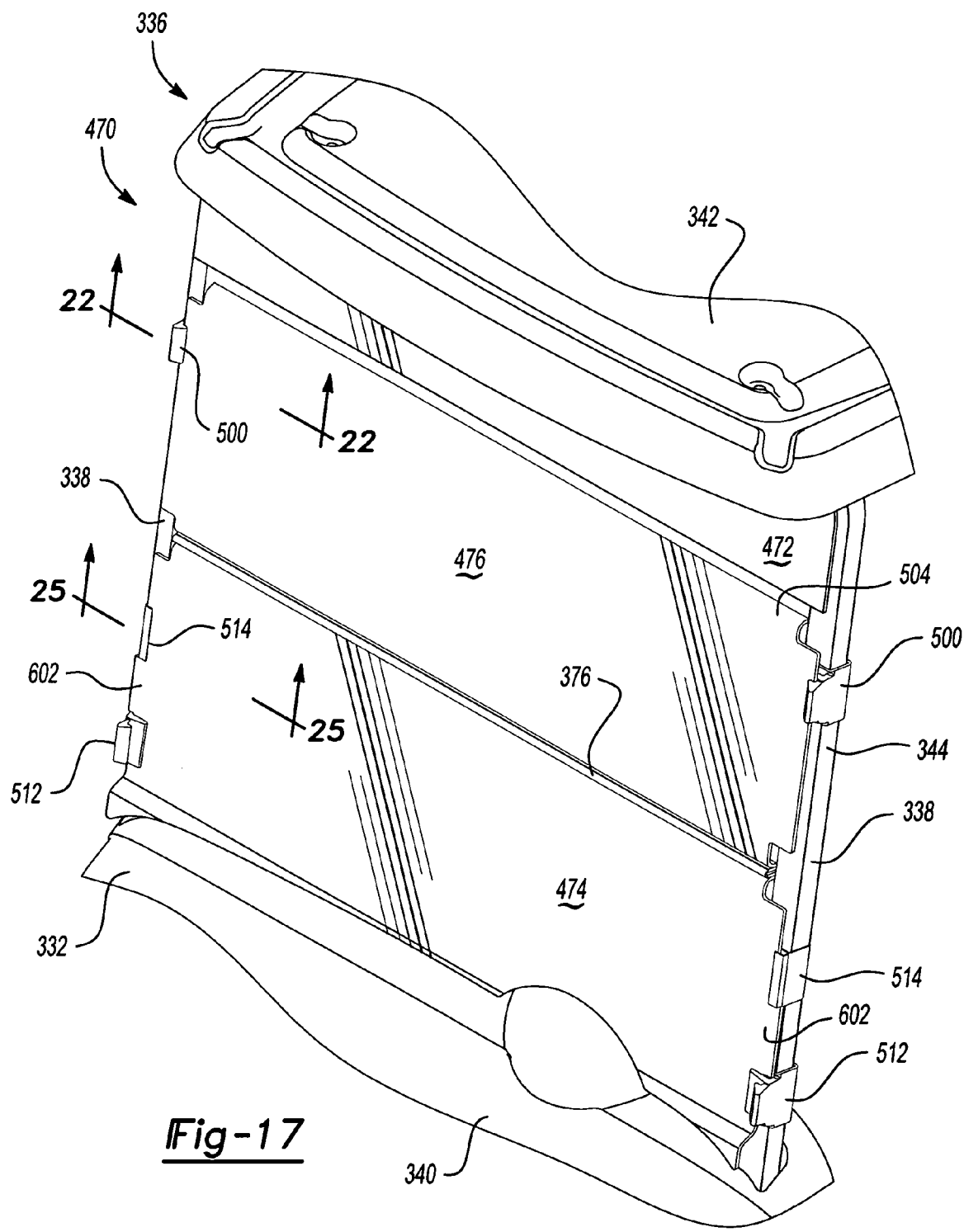
FIG. 17 is a perspective view of an exemplary three pane windshield assembly shown in an upright position according to various embodiments.

Similar to the retaining members 356 of FIG. 13, the first pair of retaining members 500 are formed of a rigid frame 530 having an integrally molded elastomeric body 532 (FIG. 22). In general, the retaining member 500 defines a main body portion 536 having a central section 540 and a pair of opposing legs 542 collectively defining a U-channel. An intermediate finger 544 extends outboard from one of the legs 542. A hook portion 548 extends outboard from the intermediate finger 544. The intermediate finger 544 and the hook portion 548 each may define a ramp 550 and 552, respectively, for facilitating cooperation with the upper window pane 472 when pivoting from a collapsed position to an upright position. In one non-limiting example, the upper window pane 472 may nest between the hook 548 and the intermediate finger 544 in the upright position (FIGS. 17 and 22). In another non-limiting example, the upper window pane 472 may nest between the intermediate finger portion 544 and a leg 542 in the upright position (not shown). In yet another non-limiting example, the intermediate finger portion 544 may be removed from the retaining member 500 and the window may next between the hook 548 and the leg 542 (not shown).

A pair of opposing tangs 550 are defined at terminal ends of the legs 542. The rigid frame defines a pair of studs 558 extending generally parallel to the legs 542. The studs 558 are adapted to be received by a complementary pair of openings 560 defined in the strut (FIG. 19). It is appreciated that one or more studs 550 may be provided on the retaining member 500. In this way, the retaining member 500 may be precluded from sliding along the strut 338 in an assembled position.

The rigid frame 530 further defines a pair of opposing heel portions 564. The heel portions 564 provide strength at the legs 542 and encourage a secure fit around the strut 338 in an installed position. The heel portions 564 and, as a result, the legs 542 provide an inward taper to facilitate assembly of the retaining member 500 around the strut 338. It is appreciated that the legs 542 of the retaining member 500 provide a degree of flexibility such that when assembled to a strut 338, the legs 542 flex outwardly as the retaining member 500 is advanced rightward (as viewed in FIG. 22) until the tangs 550 clear the strut 338. The cooperation of the studs 558 and the interaction of the legs 542 with the strut 338 provide a snap-fit for the retaining member 500. In this way, no supplemental fasteners are needed.

With reference now to FIGS. 23-25, the third pair of retaining members 514 will be described. Similar to the retaining members 356 and 500 of FIGS. 13 and 22, the third pair of retaining members 514 are formed of a rigid frame 572 having an integrally molded elastomeric body 574 (FIG. 25).

For simplicity, a single retaining member 514 is shown in FIGS. 23-25. The following discussion will be directed to one of the third pair of retaining members 514 on the front strut 338 shown in FIG. 17, however, it is appreciated that the same retaining member 514 may be adapted for use on the other front strut 338.

The retaining member 514 defines a main body portion 576 having a central section 580 and a pair of opposing legs 582 collectively defining a u-channel. A hook portion 584 extends outboard from one of the legs 582. Once installed, the retaining member 514 remains generally static. As such, the lower window pane 474 may nest between the hook 584 and one of the legs 582 in the upright and collapsed positions (FIGS. 17 and 18). A pair of opposing tangs 590 are defined at terminal ends of the legs 582. The rigid frame 572 defines a pair of studs 592 extending generally parallel to the legs 582. The studs 592 are adapted to be received by a complementary pair of openings 600 defined in the strut 338 (FIG. 19). It is appreciated that one or more studs 558 may be provided on the retaining member 514. In this way, the retaining member 514 may be precluded from sliding along the strut 338 in an assembled position. The retaining member 514 has the snap fit characteristics as described with respect to the other retaining members disclosed herein.

Returning now to FIGS. 17 and 18, the lower window pane 474 defines tabs 602 adapted to be bound on an upper edge by the third pair of retaining members 514 and on a lower edge by the second pair of retaining members 512. As a result, the lower window pane 474 is precluded from advancing vertically along the strut 338.

The description herein is merely exemplary in nature and, thus, variations that do not depart from the gist of that which is described are intended to be within the scope of the disclosure. Such variations are not to be regarded as a departure from the spirit and scope of the disclosure.

What is claimed is:

1. A window assembly cooperating with a window frame on a golf car, the window assembly comprising:
  a first window pane selectively coupled to the window frame the window frame defining at least one aperture;
  a first pair of retaining members each defining a u-channel that receives the window frame in an installed position and securably retains the first window pane relative to the window frame in a first position; and
  wherein each of the first pair of retaining members generally define a rigid frame having an integrally molded elastomeric body, the rigid frames each defining an integrally formed protrusion that extends into the at least one aperture defined in the window frame in the installed position, wherein each of the elastomeric bodies define a hook portion that engages an outboard face of the first window pane in the first position.

2. The window assembly of claim 1 wherein the rigid frames comprise plastic.

* * * * *